(12) United States Patent
Wang et al.

(10) Patent No.: US 9,712,974 B2
(45) Date of Patent: Jul. 18, 2017

(54) METHOD AND DEVICE FOR DEMODULATING A SIGNAL

(71) Applicant: Xiaomi Inc., Beijing (CN)

(72) Inventors: Xiangdong Wang, Beijing (CN); Zhenghai Wu, Beijing (CN); Feng Guo, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/946,987

(22) Filed: Nov. 20, 2015

(65) Prior Publication Data

US 2016/0080906 A1 Mar. 17, 2016

Related U.S. Application Data

(63) Continuation of application No. PCT/CN2014/076514, filed on Apr. 29, 2014.

(30) Foreign Application Priority Data

May 23, 2013 (CN) .......................... 2013 1 0195569

(51) Int. Cl.
*H04W 28/22* (2009.01)
*H04L 27/00* (2006.01)
(Continued)

(52) U.S. Cl.
CPC ............ *H04W 4/027* (2013.01); *G01S 11/10* (2013.01); *G01S 19/52* (2013.01);
(Continued)

(58) Field of Classification Search
CPC .. G01S 11/10; G01S 19/52; H04L 2027/0036; H04L 2027/0046;
(Continued)

(56) References Cited

U.S. PATENT DOCUMENTS 6,091,780 A 7/2000 Sointula
6,553,007 B1* 4/2003 Pekkarinen .............. H04B 7/01
342/161

(Continued)

FOREIGN PATENT DOCUMENTS

CN 101702636 5/2010
CN 101980453 2/2011

(Continued)

OTHER PUBLICATIONS

Extended European Search Report received from European Patent Office for Application No. 14800268.6, dated Nov. 11, 2016 (9 pages).

(Continued)

*Primary Examiner* — Nathan Taylor
(74) *Attorney, Agent, or Firm* — Finnegan, Henderson, Farabow, Garrett & Dunner LLP (57) ABSTRACT

A method for demodulating a signal is provided. The method includes: acquiring a reference clock signal provided by a power management unit (PMU) in a mobile terminal; determining a moving velocity of the mobile terminal; determining, based on the moving velocity, a Doppler frequency shift value generated when the mobile terminal receives a radio frequency (RF) signal transmitted by a base station; and demodulating, according to the reference clock signal and the Doppler frequency shift value, the received RF signal.

16 Claims, 12 Drawing Sheets (51) Int. Cl.
*H04W 4/02* (2009.01)
*G01S 11/10* (2006.01)
*G01S 19/52* (2010.01)
*H04W 56/00* (2009.01)

(52) U.S. Cl.
CPC ..... *H04L 27/0014* (2013.01); *H04W 56/0035* (2013.01); *H04L 2027/0036* (2013.01); *H04L 2027/0046* (2013.01); *H04L 2027/0083* (2013.01)

(58) Field of Classification Search
CPC ....... H04L 2027/0083; H04L 27/0014; H04W 4/027; H04W 56/0035
USPC ...................................................... 455/456.1
See application file for complete search history.

(56) References Cited

U.S. PATENT DOCUMENTS

| | | | | |
|---|---|---|---|---|
| 7,012,973 | B1* | 3/2006 | Piirainen | H04B 7/01 375/340 |
| 2002/0186161 | A1* | 12/2002 | Szajnowski | G01S 13/52 342/62 |
| 2004/0116121 | A1* | 6/2004 | Sendonaris | H04W 56/0035 455/441 |
| 2006/0128428 | A1* | 6/2006 | Rooyen | H04H 20/57 455/553.1 |
| 2008/0171515 | A1* | 7/2008 | Kim | H04L 27/2657 455/63.1 |
| 2009/0279476 | A1* | 11/2009 | Li | H04B 7/015 370/328 |
| 2009/0310505 | A1* | 12/2009 | Tsai | G01S 5/14 370/252 |
| 2009/0323789 | A1* | 12/2009 | Ragab | H04L 25/0224 375/224 |
| 2010/0156545 | A1* | 6/2010 | Brodie | H03L 1/022 331/66 |
| 2010/0290356 | A1* | 11/2010 | Hadad | H04B 7/01 370/252 |
| 2011/0032920 | A1* | 2/2011 | Suberviola | H04B 1/7075 370/342 |
| 2013/0287080 | A1* | 10/2013 | Li | H04L 27/0014 375/224 |
| 2013/0329721 | A1* | 12/2013 | Doetsch | H04L 27/0014 370/350 |
| 2015/0085853 | A1* | 3/2015 | Smith | H04W 56/0015 370/350 |

FOREIGN PATENT DOCUMENTS

| | | |
|---|---|---|
| CN | 202374290 | 8/2012 |
| CN | 102868435 | 1/2013 |
| CN | 103078660 | 5/2013 |
| CN | 103269259 | 8/2013 |
| EP | 2 490 389 A1 | 8/2012 |
| JP | 05-022183 A | 1/1993 |
| JP | 2007-221310 A | 8/2007 |
| JP | 2008-206023 A | 9/2008 |
| KR | 20010048014 A | 6/2001 |
| KR | 20050013306 A | 2/2005 |
| RU | 2102836 C1 | 1/1998 |
| RU | 2422909 C1 | 6/2011 |
| WO | WO 2008/084700 A1 | 7/2008 |
| WO | WO 2012/058600 A2 | 5/2012 |

OTHER PUBLICATIONS

English translation of International Search Report for International Application No. PCT/CN2014/076514, dated Aug. 4, 2014, (2 pages).

Mexican Examination Report received from Mexican Patent Office for Application No. MX/a/2015/007305, dated May 24, 2016 (8 pages).

Decision to Grant received from Patent Office of Russian Federation for Application No. 2015128654/07, dated Aug. 23, 2016, (17 pages).

* cited by examiner

METHOD AND DEVICE FOR DEMODULATING A SIGNAL

CROSS-REFERENCE TO RELATED APPLICATIONS

This application is a continuation application of International Application No. PCT/CN2014/076514, filed Apr. 29, 2014, which is based upon and claims priority to Chinese Patent Application No. 201310195569.3, filed May 23, 2013, the entire contents of all of which are incorporated herein by reference.

TECHNICAL FIELD

The present disclosure generally relates to the field of mobile terminals and, more particularly, to a method and a device for demodulating a signal.

BACKGROUND

Wireless communication rate plays an important role in user experience of mobile devices. When a user is in a moving state, due to the presence of a Doppler effect, a Doppler frequency shift may be generated. When the user moves with a high velocity, a relatively large Doppler frequency shift may be present in a signal received at the mobile terminal from a base station. In this scenario, the Doppler frequency shift value, i.e. a difference value between a frequency of the received signal and a frequency of the signal actually transmitted by the base station, is relatively large. A large Doppler frequency shift may affect the radio frequency (RF) demodulation accuracy and data throughput of a communication system, resulting in a low communication rate.

SUMMARY

According, to a first aspect of the present disclosure, there is provided a method for demodulating a signal, comprising: acquiring a reference clock signal provided by a power management unit (PMU) in a mobile terminal; determining a moving velocity of the mobile terminal; determining, based on the moving velocity, a Doppler frequency shift value generated when the mobile terminal receives a radio frequency (RF) signal transmitted by a base station; and demodulating, according to the reference clock signal and the Doppler frequency shift value, the received RF signal.

According to a second aspect of the present disclosure, there is provided a device for demodulating a signal, comprising: an acquiring unit configured to acquire a reference clock signal provided by a power management unit (PMU) in a mobile terminal; a determining unit configured to determine a moving velocity of the mobile terminal, and determine, based on the moving velocity, a Doppler frequency shift value generated when the mobile terminal receives a RF signal transmitted by a base station; and a demodulating unit configured to demodulate, according to the reference clock signal and the Doppler frequency shift value, the received RF signal.

According to a third aspect of the present disclosure, there is provided a device for demodulating a signal, comprising: a power management unit (PMU) configured to provide a reference clock signal; a clock acquisition (CA) module coupled to the PMU, the CA module configured to: determine a moving velocity of a mobile terminal; determine, based on the moving velocity, a Doppler frequency shift value generated when the mobile terminal receives a RF signal transmitted by a base station; and determine, according to the Doppler frequency shift value and the reference clock signal, a demodulation clock signal; and a receiver coupled to the CA module, and configured to acquire the RF signal and the demodulation clock signal, and demodulate the RF signal according to the demodulation clock signal.

According to a fourth aspect of the present disclosure, there is provided a device for demodulating a signal, comprising: a power management unit (PMU) configured to provide a reference clock signal; a receiver configured to determine a moving velocity of a mobile terminal; and a processing unit configured to determine, according to the moving velocity, a Doppler frequency shift value generated when the mobile terminal receives a radio frequency (RF) signal transmitted by a base station, wherein: the receiver is coupled to the PMU and the processing unit, and the receiver is configured to acquire the RF signal, the reference clock signal, and the Doppler frequency shift value, and demodulate, according to the reference clock signal and the Doppler frequency shift value, the RF signal.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Embodiments of the present disclosure provide a method and a device for demodulating a signal to reduce the effect on the communication rate due to the Doppler frequency shift. In demodulation of a received radio frequency (RF) signal transmitted by a base station, after a reference clock signal provided by a power management unit (PMU) is acquired, a moving velocity of a mobile terminal may be determined. A Doppler frequency shift value generated when the mobile terminal receives a RF signal transmitted by a base station may be determined according to the moving velocity, and the received RF signal transmitted by the base station may be demodulated according to the reference clock signal and the Doppler frequency shift value. By taking into account the effect of the Doppler frequency shift in demodulation of the RF signal transmitted by the base station, the demodulation accuracy may be improved, thereby relieving the problem of a low communication rate in presence of Doppler frequency shift.

Figure 1:
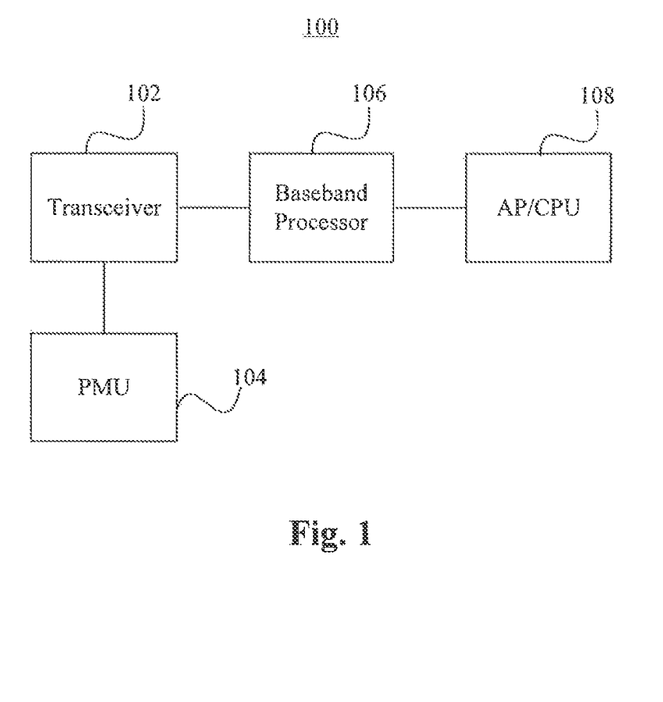
FIG. 1 is a block diagram of a demodulation device, according to an exemplary embodiment.

FIG. 1 is a block diagram of a demodulation device 100, according to an exemplary embodiment. The demodulation device 100 may be implemented as a part or all of a mobile terminal in a Wideband Code Division Multiple Access (WCDMA) system, a Global Positioning System (GPS), or other communication systems. As shown in FIG. 1, the demodulation device 100 includes a transceiver 102, a PMU 104, a baseband processor 106, and an Application Processor (AP)/Central Processing Unit (CPU) 108. The transceiver 102 provides an RF-demodulation function, and sends a baseband signal to the baseband processor 106 for processing. The baseband processor 106 then sends data to the AP/CPU 108. The transceiver 102 uses a reference clock signal for demodulation. The reference clock signal is provided by the PMU 104, and the transceiver 102 demodulates WCDMA or other RF signals according to the reference clock signal. The demodulation accuracy of the transceiver 102 is dependent on the reference clock signal value. Higher demodulation accuracy usually leads to a higher communication throughput between the mobile terminal and the base station and a faster communication rate of the corresponding communication system. However, in the demodulation device 100, the demodulation of the RF signal according to the reference clock signal provided by the PMU 104 does not take into account the effect of Doppler shift on the demodulation of the RF signal. When a moving velocity of the mobile terminal is high, demodulation accuracy of the RF signal may be reduced due to the Doppler shift effect, resulting in a lower communication rate.

Figure 2:
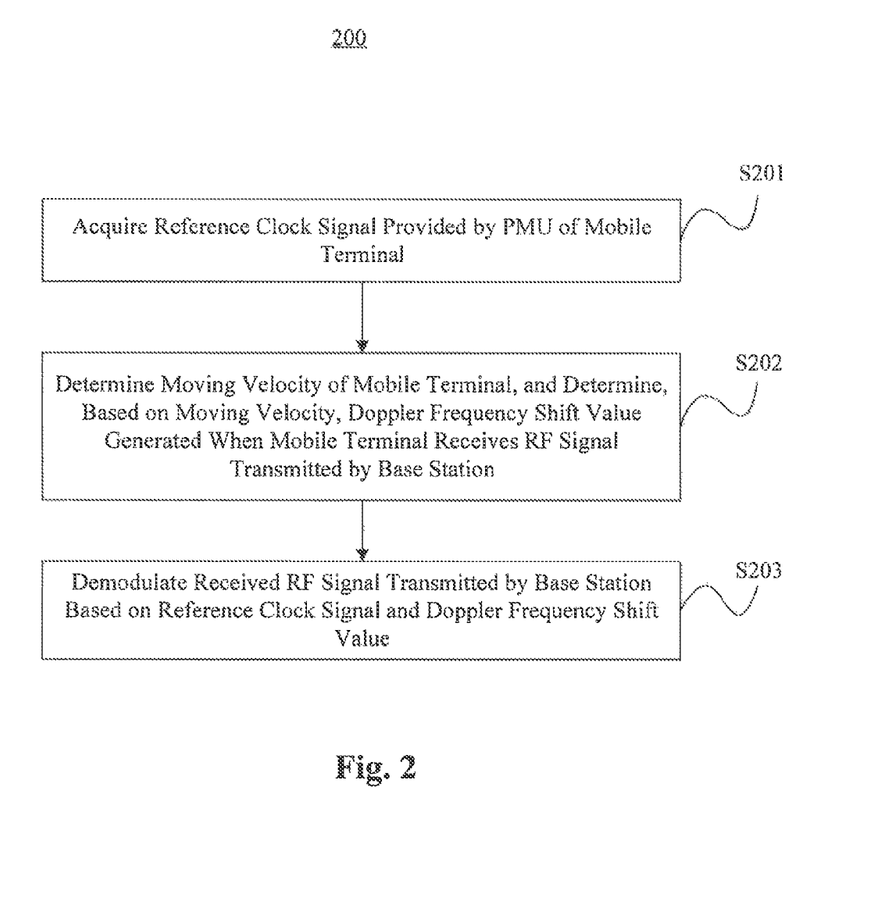
FIG. 2 is a flowchart of a method for demodulating a signal, according to an exemplary embodiment.

FIG. 2 is a flowchart of a method 200 for demodulating a signal, according to an exemplary embodiment. The method 200 may be performed by a demodulation device of a mobile terminal. Referring to FIG. 2, the method 200 includes the following steps.

In step S201, the demodulation device acquires a reference clock signal provided by a PMU of the mobile terminal.

In step S202, the demodulation device determines a moving velocity of the mobile terminal, and determines a Doppler frequency shift value based on the moving velocity when the mobile terminal receives ex/RF signal transmitted by abuse station.

In step S203, the demodulation device demodulates the received RF signal transmitted by the base station based on the reference clock signal and the Doppler frequency shift value.

In the method 200, the RF signal transmitted by the base station is demodulated based on the reference clock signal provided by the PMU and the Doppler frequency shift value, thereby improving the demodulation accuracy of the RF signal and the communication rate in presence of Doppler frequency shift.

Figure 3:
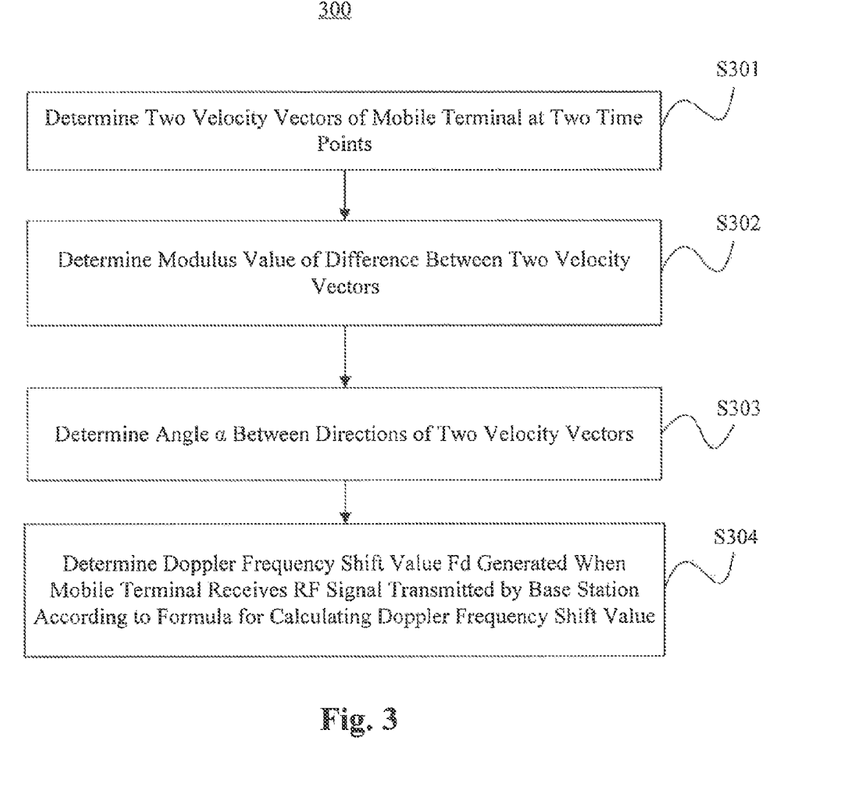
FIG. 3 is a flowchart of a method for determining a Doppler frequency shift value, according to an exemplary embodiment.

FIG. 3 is a flowchart of a method 300 for determining a Doppler frequency shift value, according to an exemplary embodiment. The method 300 may be performed by a demodulation device of a mobile terminal. Referring to FIG. 3, the method 300 includes the following steps.

In step S301, the demodulation device determines two velocity vectors of the mobile terminal at two different time points. For example, the two velocity vectors of the mobile terminal may be determined through a GPS.

In step S302, the demodulation device determines a modulus value $|\Delta V|$ of a difference between the two velocity vectors.

In step S303, the demodulation device determines an angle $\alpha$ between directions of the two velocity vectors.

In step S304 the demodulation device determines the Doppler frequency shift value Fd generated when the mobile terminal receives the RF signal transmitted by the base station according to a formula for calculating a Doppler frequency shift value $Fd=|\Delta V|*\cos\alpha/\lambda$, where $\lambda$ denotes a radio wavelength.

In some embodiments, $|\Delta V|$ and $\alpha$ may be determined through the GPS. The two time points may be selected as desired by one skilled in the art. For example, the two time points may be selected according to acquiring time of the reference clock signal provided by the PMU. For example, the two time points may be set as the acquiring time of two selected reference clock signals. The two selected reference clock signals may be two reference clock signals that are acquired at a time most close to a current time.

Figure 4:
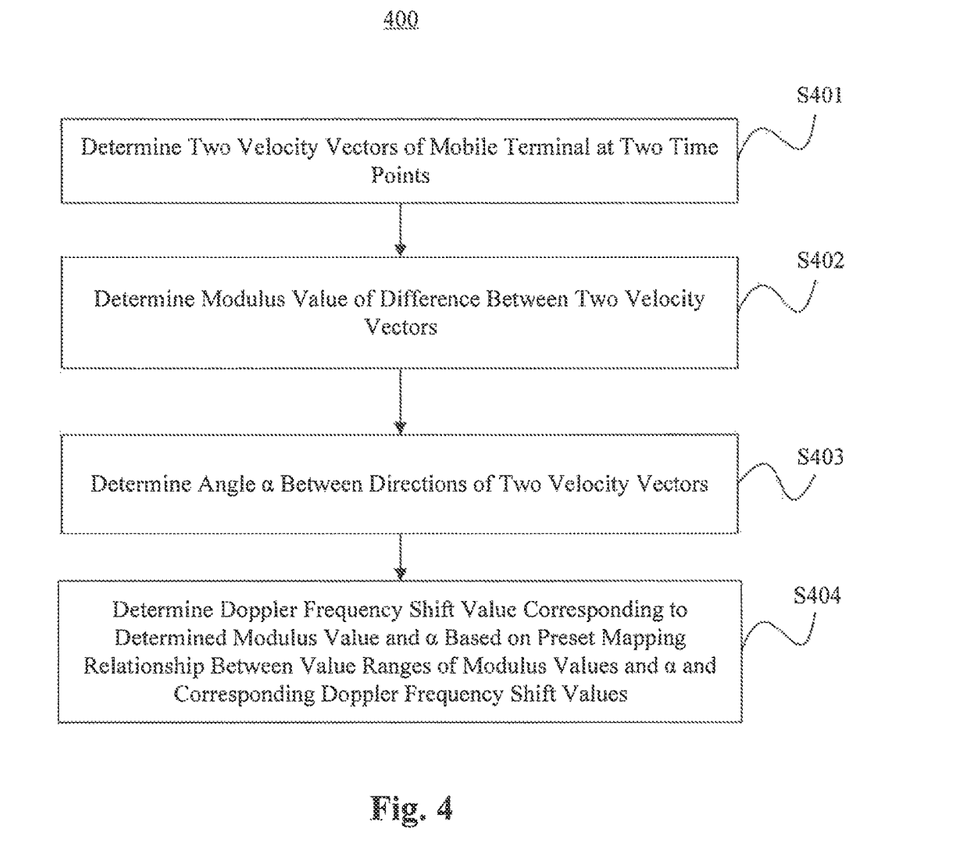
FIG. 4 is a flowchart of a method for determining a Doppler frequency shift value, according to an exemplary embodiment.

FIG. 4 is a flowchart of a method 400 for determining a Doppler frequency shift value, according to an exemplary embodiment. The method 400 may be performed by a demodulation device of a mobile terminal. Referring to FIG. 4, the method 400 may include the following steps.

In step S401, the demodulation device determines two velocity vectors of the mobile terminal at two time points. For example, the velocity vectors of the mobile terminal may be determined through a GPS.

In step S402, the demodulation device determines a modulus value $|\Delta V|$ of a difference between the two velocity vectors.

In step S403, the demodulation device determines an angle $\alpha$ between directions of the two velocity vectors.

In step S404, the demodulation device determines the Doppler frequency shift value corresponding to the determined $|\Delta V|$ and $\alpha$ based on a preset mapping relationship between value ranges of $|\Delta V|$ and $\alpha$ and corresponding Doppler frequency shift values. For example, the demodulation device may search the preset mapping relationship to obtain the Doppler frequency shift value corresponding to the determined $|\Delta V|$ and $\alpha$.

In some embodiments, the modulus value of the difference between the two velocity vectors and the angle between the directions of the two velocity vectors may be acquired by the GPS, and the mapping relationship between the value ranges of the modulus value of the difference between the two velocity vectors and the angle between the directions of the two velocity vectors may be preset according to $Fd=|\Delta V|*\cos\alpha/\lambda$, and the accuracy of the mapping relationship may be set as desired by one skilled in the art.

By presetting the mapping relationship for the value ranges of the modulus value of the difference between the two velocity vectors and the angle between the directions of the two velocity vectors of the mobile terminal at the two time points, a corresponding Doppler frequency shift value may be determined based on the mapping relationship, thereby reducing the processing load of the mobile terminal.

The methods 300 (FIG. 3) and 400 (FIG. 4) are provided as examples for determining a Doppler frequency shift value Those skilled in the art may adopt other methods to determine a Doppler frequency shift value according to the moving velocity without departing from the scope of the present disclosure.

Figure 5:
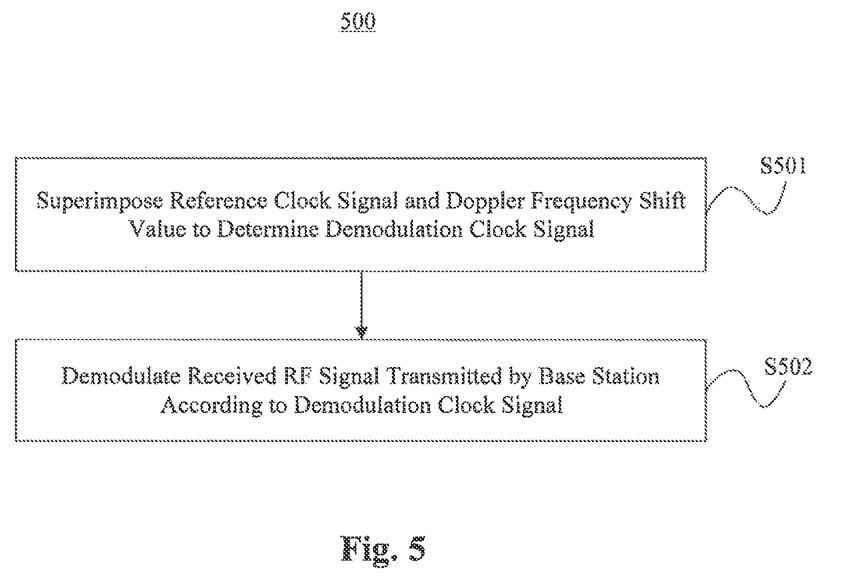
FIG. 5 is a flowchart of a demodulating method, according to an exemplary embodiment.

FIG. 5 is a flowchart of a demodulating method 500, according to an exemplary embodiment. The method 500 may be performed by a demodulation device of a mobile terminal for demodulating a received RF signal transmitted by a base station based on a reference clock signal and a Doppler frequency shift value. Referring to FIG. 5, the method 500 includes the following steps.

In step S501, the demodulation device superimposes the reference clock signal and the Doppler frequency shift value to determine a demodulation clock signal.

In step S502, the demodulation device demodulates the received RF signal transmitted by the base station according to the demodulation clock signal.

Figure 6:
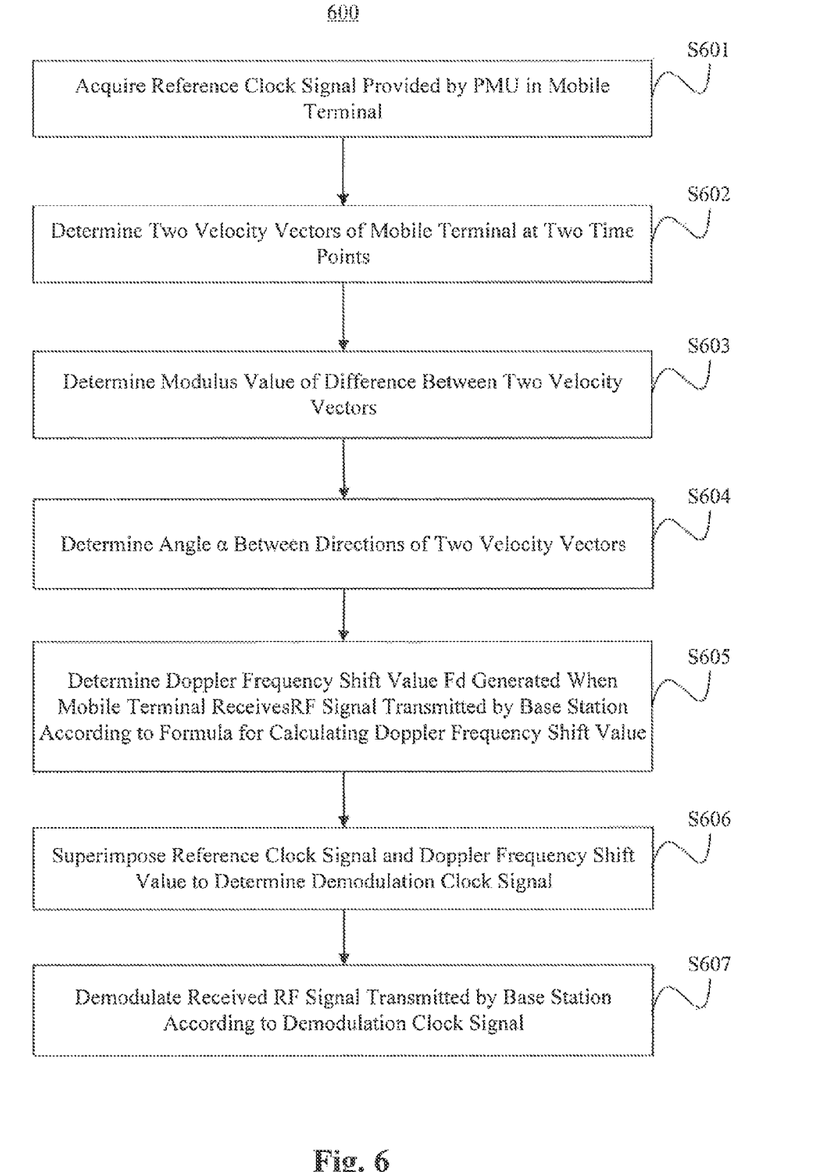
FIG. 6 is a flowchart of a demodulating method, according to an exemplary embodiment.

FIG. 6 is a flowchart of a demodulating method 600, according to an exemplary embodiment. The method 600 may be performed by a demodulation device of a mobile terminal. Referring to FIG. 6, the method 600 includes the following steps.

In step S601, the demodulation device acquires a reference clock signal provided by a PMU in a mobile terminal.

In step S602, the demodulation device determines two velocity vectors of the mobile terminal at two time points. For example, the velocity vectors may be determined through a GPS.

In step S603, the demodulation device determines a modulus value $|\Delta V|$ of a difference between the two velocity vectors.

In step S604, the demodulation device determines an angle $\alpha$ between directions of the two velocity vectors.

In step S605, the demodulation device determines the Doppler frequency shift value Ed generated when the mobile terminal receives the RE signal transmitted by the base station according to a formula for calculating a Doppler frequency shift value $Fd=|\Delta V|*\cos \alpha/\lambda$, where denotes a radio wavelength.

In step S606, the demodulation device superimposes the reference clock signal and the Doppler frequency shift value to determine a demodulation clock signal.

In step S607, the demodulation device demodulates the received RE signal transmitted by the base station according to the demodulation clock signal.

Figure 7:
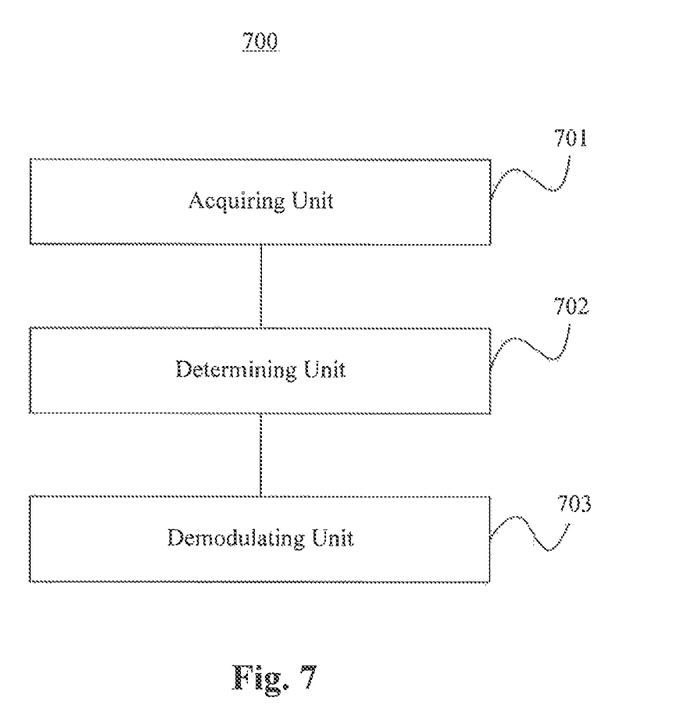
FIG. 7 is a block diagram of a device for demodulating a signal, according to an exemplary embodiment.

FIG. 7 is a block diagram of a device 700 for demodulating a signal, according to an exemplary embodiment. The device 700 may be implemented to be a part or all of a mobile terminal. Referring to FIG. 7, the device 700 includes an acquiring unit 701, a determining unit 702, and a demodulating unit 703.

The acquiring unit 701 is configured to acquire a reference clock signal provided by a PMU in the mobile terminal.

The determining unit 702 is configured to determine a moving velocity of the mobile terminal, and determine, based on the moving velocity, a Doppler frequency shift value generated when the mobile terminal receives a RF signal transmitted by a base station. In some embodiments, the Doppler frequency shift value may be determined using the above describe method 300 or 400.

The demodulating unit 703 is configured to demodulate the received RF signal transmitted by the base station according to the reference clock signal and the Doppler frequency shift value.

Figure 8A:
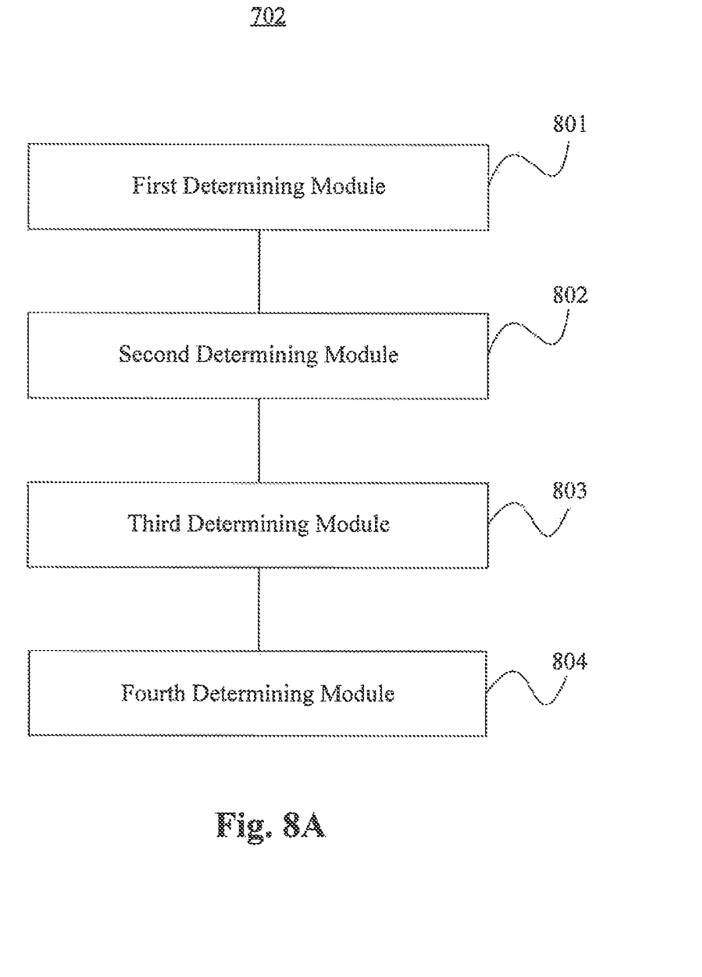
FIG. 8A is a block diagram of a determination unit, according to an exemplary embodiment.

FIG. 8A is a block diagram of the determining unit 702 (FIG. 7), according to an exemplary embodiment. Referring to FIG. 8A, the determination unit 702 includes a first determining module 801, a second determining module 802, a third determining module 803, and a fourth determining module 804.

The first determining module 801 is configured to determine two velocity vectors of the mobile terminal at two time points. For example, a GPS may be used to determine the two velocity vectors of the mobile terminal at the two time points.

The second determining module 802 is configured to determine a modulus value $|\Delta V|$ of a difference between the two velocity vectors.

The third determining module 803 is configured to determine an angle $\alpha$ between directions of the two velocity vectors.

The fourth determining module 804 is configured to determine the Doppler frequency shift value Fd generated when the mobile terminal receives the RF signal transmitted by the base station according to a formula for calculating a Doppler frequency shift value $Fd=|\Delta V|*\cos \alpha/\lambda$, where $\lambda$ denotes a radio wavelength.

In some embodiments, $|\Delta V|$ and $\alpha$ may be determined through the GPS. The two time points may be selected as desired by one skilled in the art. For example, the two time points may be selected according to acquiring time of the reference clock signal provided by the PMU. For example, the two time points may be set as the acquiring time of two preset reference clock signals. The two preset reference clock signals may be two reference clock signals that are acquired at a time most close to a current time.

Figure 8B:
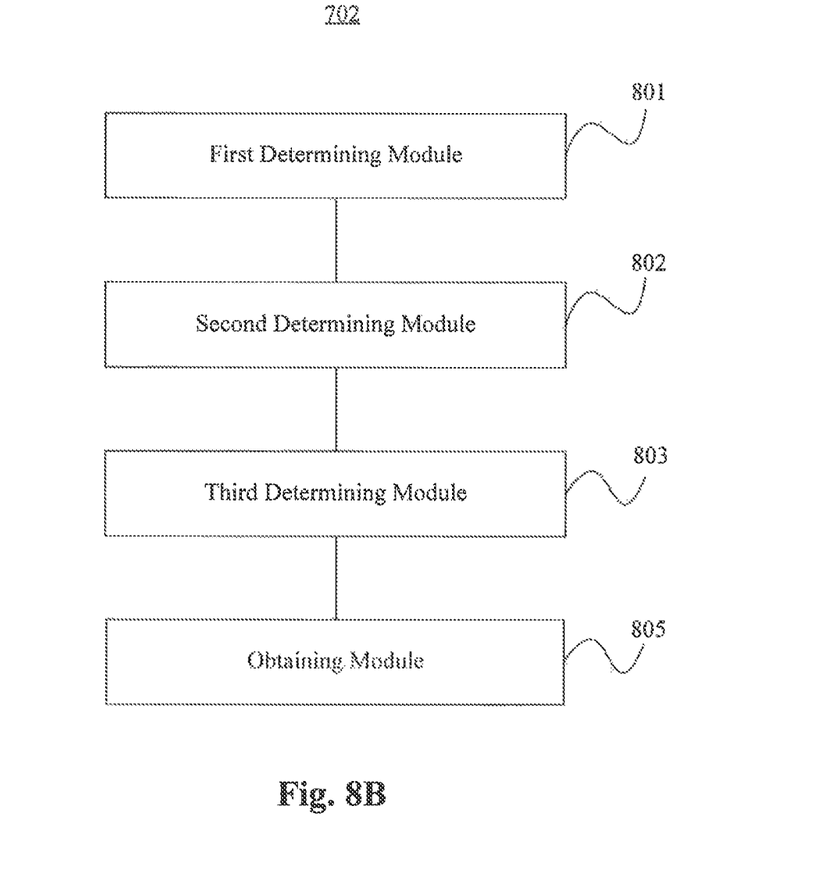
FIG. 8B is a block diagram of a determination unit, according to an exemplary embodiment.

FIG. 8B is a block diagram of the determining unit 702 (FIG. 7), according to an exemplary embodiment. Referring to 8B, the determining unit 702 includes a first determining module 801, a second determining module 802, a third determining module 803, and an obtaining module 805.

The first determining module 801 is configured to determine two velocity vectors of the mobile terminal at two time points. For example, the velocity vectors of the mobile terminal at the two time points may be determined through a GPS.

The second determining module 802 is configured to determine a modulus value $|\Delta V|$ of a difference between the two velocity vectors.

The third determining module 803 is configured to determine an angle $\alpha$ between directions of the two velocity vectors.

The obtaining module 805 is configured to obtain the Doppler frequency shift value corresponding to the determined $|\Delta V|$ and $\alpha$ based on a preset mapping relationship between value ranges of $|\Delta V|$ and $\alpha$ and Doppler frequency shift values.

For example, the two velocity vectors of the mobile terminal and the angle between the directions of the two velocity vectors may be acquired by the UPS of the mobile terminal, and the preset mapping relationship for the value ranges of the modulus value of the difference between the two velocity vectors and the angle between the directions of the two velocity vectors may be determined according to $Fd=|\Delta V|*\cos \alpha/\lambda$.

By presetting the mapping relationship for the value ranges of the modulus value of the difference between the velocity vectors and the angle between the directions of the velocity vectors at the two time points, the processing load of the mobile terminal may be reduced.

Figure 9:
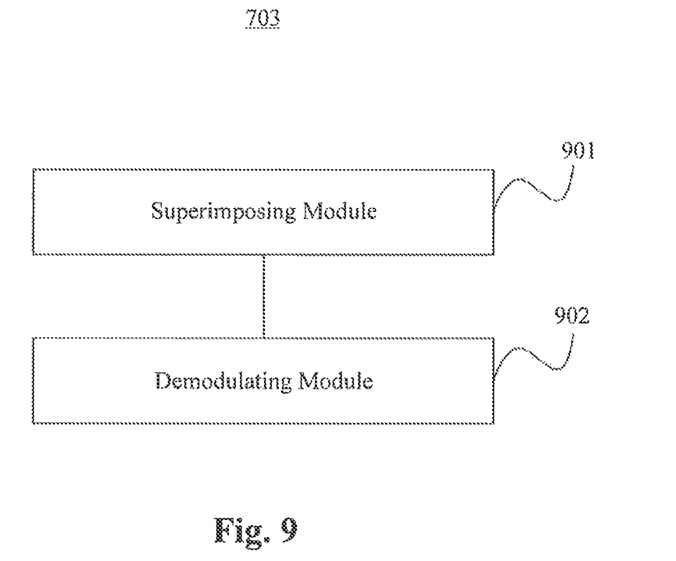
FIG. 9 is a block diagram of a demodulating unit, according to an exemplary embodiment.

FIG. 9 is a block diagram of the demodulating unit 703 (FIG. 7), according to an exemplary embodiment. Referring to FIG. 9, the demodulating unit 703 includes a superimposing module 901 and a demodulating module 902.

The superimposing module 901 is configured to superimpose the reference clock signal and the Doppler frequency shift value to determine a demodulation clock signal.

The demodulating module 902 is configured to demodulate the received RF signal transmitted by the base station according to the demodulation clock signal.

Figure 10:
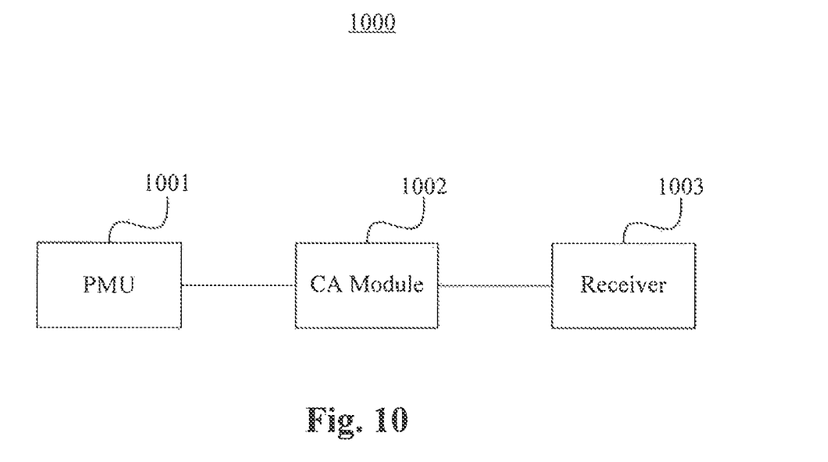
FIG. 10 is a block diagram of a device for demodulating a signal, according to an exemplary embodiment.

FIG. 10 is a block diagram of a device 1000 for demodulating a signal, according to an exemplary embodiment. Referring to FIG. 10, the device 1000 includes a PMU 1001, a clock acquisition (CA) module 1002, and a receiver 1003.

The PMU 1001 is configured to provide a reference clock signal.

The CA module 1002 is coupled to the PIM 1001, and is configured to determine a moving velocity of a mobile terminal, determine a Doppler frequency shift value generated when the mobile terminal receives a RF signal transmitted by a base station according to the moving velocity, and determine a demodulation clock signal according to the Doppler frequency shift value and the reference clock signal provided by the PMU.

The receiver 1003 is coupled to the CA module 1002, and is configured to acquire the RF signal transmitted by the base station and the demodulation clock signal determined by the CA module 1002, and demodulate the RF signal transmitted by the base station according to the demodulation clock signal.

Before demodulation of a received RF signal transmitted by a base station, the receiver 1003 may acquire a reference clock signal provided by the PMU 1001. The CA module 1002 may determine a moving velocity of the mobile terminal and determine, based on the moving velocity, a Doppler frequency shift value generated when the mobile terminal receives the RF signal transmitted by a base station. The CA module 1002 may further determine a demodulation clock signal according to the Doppler frequency shift value and the reference clock signal provided by the PMU 1001. Then the receiver 1003 may demodulate the RF signal transmitted by the base station according to the demodulation clock signal.

In some implementations, the CA module 1002 is configured to superimpose the reference clock signal and the Doppler frequency shift value through a direct digital frequency synthesizer (DDS) to determine the demodulation clock signal.

In some embodiments, the device 1000 may further include a coupling module coupled to the CA module 1002, and configured to couple an RE signal reflecting the moving velocity, e.g., an RE signal acquired by a GPS, to the CA module 1002, in doing so, interferences of the CA module 1002 to other modules that require processing of the RF signal reflecting the moving velocity may be avoided.

Figure 11:
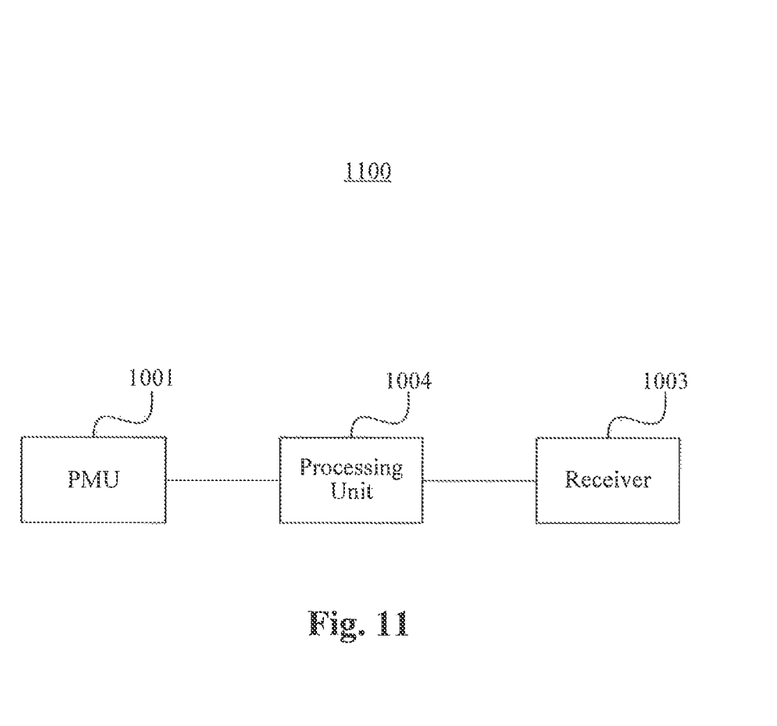
FIG. 11 is a block diagram of a device for demodulating a signal, according to an exemplary embodiment.

FIG. 11 is a block diagram of a device 1100 for demodulating a signal, according to an exemplary embodiment. Referring to FIG. 11, the device 1100 includes a processing unit 1004, the PMU 1001 (FIG. 10), and the receiver 1003 (FIG. 10).

The PMU 1001 is configured to provide a reference clock signal.

The processing unit 1004 is configured to determine a Doppler frequency shift value generated when a mobile terminal receives a RF signal transmitted by a base station according to a moving velocity determined by the receiver 1003.

The receiver 1003 is coupled to the PMU 1001 and the processing unit 1004. The receiver 1003 is configured to determine the moving velocity of the mobile terminal, acquire the RF signal transmitted by the base station, the reference clock signal provided by the PMU 1001 and the Doppler frequency shift value determined by the processing unit 1004, and demodulate the RF signal transmitted by the base station according to the reference clock signal and the Doppler frequency shift value.

Before demodulation of a received RE signal transmitted by the base station, a reference clock signal provided by the PMU 1001 is acquired by the receiver 1003, the receiver 1003 is configured to determine a moving velocity of the mobile terminal. The processing unit 1004 is configured to determine a Doppler frequency shift value generated when the mobile terminal receives the RF signal transmitted by the base station according to the moving velocity. Then the receiver 1003 demodulates the RF signal transmitted by the base station according to the reference clock signal and the Doppler frequency shift value, thereby improving the demodulation accuracy by taking account of the Doppler frequency shift.

The processing unit 1004 may include an application processor (AP), a central processing unit (CPU) or the like. The processing unit 1004 may be configured to execute instructions so as to perform all or a part of the steps in the above described methods.

In exemplary embodiments, there is further provided a non-transitory computer readable storage medium including instructions executable by one or more processors to perform the above-described methods. For example, the non-transitory computer-readable storage medium may be a read-only memory (ROM), a random access memory (RAM), a CD-ROM, a magnetic tape, a floppy disc, an optical data storage device, and the like.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It should be understood that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for demodulating a signal, comprising:
   acquiring a reference clock signal provided by a power management unit (PMU) in a mobile terminal;
   determining a moving velocity of the mobile terminal;
   determining, based on the moving velocity, a Doppler frequency shift value generated when the mobile terminal receives a radio frequency (RF) signal transmitted by a base station; and demodulating, according to the reference clock signal and the Doppler frequency shift value, the received RF signal.

2. The method according to claim 1, wherein determining the Doppler frequency shift value comprises:
   determining two velocity vectors of the mobile terminal at two time points;
   determining a modulus value |ΔV| of a difference between the two velocity vectors;
   determining an angle α between directions of the two velocity vectors; and
   determining the Doppler frequency shift value Fd according to Fd=|ΔV|*cos α/λ, wherein λ is a radio wavelength.

3. The method according to claim 2, wherein a global positioning system (GPS) is used for determining the two velocity vectors.

4. The method according to claim 1, wherein determining the Doppler frequency shift value comprises:
   determining two velocity vectors of the mobile terminal at two time points;
   determining a modulus value |ΔV| of a difference between the two velocity vectors;
   determining an angle α between directions of the two velocity vectors; and
   obtaining the Doppler frequency shift value based on a preset mapping relationship between the determined modulus value |ΔV| and angle α and the Doppler frequency shift value.

5. The method according to claim 1, wherein demodulating the received RF signal comprises:
   superimposing the reference clock signal and the Doppler frequency shift value to determine a demodulation clock signal; and
   demodulating the received RF signal according to the demodulation clock signal.

6. A device for demodulating a signal, comprising:
   an acquiring unit configured to acquire a reference clock signal provided by a power management unit (PMU) in a mobile terminal;
   a determining unit configured to determine a moving velocity of the mobile terminal, and determine, based on the moving velocity, a Doppler frequency shift value generated when the mobile terminal receives a RF signal transmitted by a base station; and
   a demodulating unit configured to demodulate, according to the reference clock signal and the Doppler frequency shift value, the received RF signal.

7. The device according to claim 6, wherein the determining unit comprises one or more processors configured to:
   determine two velocity vectors of the mobile terminal at two time points;
   determine a modulus value |ΔV| of a difference between the two velocity vectors;
   determine an angle α between directions of the two velocity vectors; and
   determine the Doppler frequency shift value Fd according to Fd=|ΔV|*cos α/λ, wherein λ is a radio wavelength.

8. The device according to claim 7, wherein a global positioning system (GPS) is used for determining the two velocity vectors.

9. The device according to claim 6, wherein the determining unit comprises one or more processors configured to:
   determine two velocity vectors of the mobile terminal at two time points;
   determine a modulus value |ΔV| of a difference between the two velocity vectors;
   determine an angle α between directions of the two velocity vectors; and
   obtain the Doppler frequency shift value based on a preset mapping relationship between the determined modulus value |ΔV| and angle α and the Doppler frequency shift value.

10. The device according to claim 6, wherein the demodulating unit comprises one or more processors configured to:
    superimpose the reference clock signal and the Doppler frequency shift value to determine a demodulation clock signal; and
    demodulate the received RF signal according to the demodulation clock signal.

11. A device for demodulating a signal, comprising:
    a power management unit (PMU) configured to provide a reference clock signal;
    a clock acquisition (CA) module coupled to the PMU, the CA module configured to:
      determine a moving velocity of a mobile terminal;
      determine, based on the moving velocity, a Doppler frequency shift value generated when the mobile terminal receives a RF signal transmitted by abuse station; and
      determine, according to the Doppler frequency shift value and the reference clock signal, a demodulation clock signal; and
    a receiver coupled to the CA module, and configured to acquire the RF signal and the demodulation clock signal, and demodulate the RF signal according to the demodulation clock signal.

12. The device according to claim 11, wherein the CA module comprises a direct digital frequency synthesizer (DDS) configured to superimpose the reference clock signal and the Doppler frequency shift value to determine the demodulation clock signal.

13. The device according to claim 11, further comprising:
    a coupling module coupled to the CA module, the coupling module being configured to couple the RF signal reflecting the moving velocity to the CA module.

14. The device according to claim 13, wherein the RF signal reflecting the moving velocity is acquired by a global positioning system (GPS).

15. A device for demodulating a signal, comprising:
    a power management unit (PMU) configured to provide a reference clock signal;
    a receiver configured to determine a moving velocity of a mobile terminal; and
    a processing unit configured to determine, according to the moving velocity, a Doppler frequency shift value generated when the mobile terminal receives a radio frequency (RF) signal transmitted by a base station, wherein:
    the receiver is coupled to the PMU and the processing unit, and the receiver is configured to acquire the RF signal, the reference clock signal, and the Doppler frequency shift value, and demodulate, according to the reference clock signal and the Doppler frequency shift value, the RF signal.

16. The device according to claim 15, wherein the processing unit includes an application processor (AP) or a central processing unit (CPU).

* * * * *